United States Patent
Bürgi et al.

(10) Patent No.: US 10,042,368 B2
(45) Date of Patent: *Aug. 7, 2018

(54) FLOW RATE MEASURING UNIT AND FLOW RATE CONTROL UNIT

(71) Applicant: Axetris AG, Kägiswil (CH)

(72) Inventors: Stefan Bürgi, Baar (CH); Adrian Dänzer, Lucerne (CH); Christoph Bächler, Winterthur (CH)

(73) Assignee: Axetris AG, Kägiswil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,640

(22) Filed: Nov. 29, 2016

(65) Prior Publication Data

US 2017/0153651 A1    Jun. 1, 2017

(30) Foreign Application Priority Data

Nov. 30, 2015   (DE) .................. 10 2015 120 792

(51) Int. Cl.

| | |
|---|---|
| *G01F 1/68* | (2006.01) |
| *G05D 7/06* | (2006.01) |
| *G01F 1/684* | (2006.01) |
| *G01F 5/00* | (2006.01) |
| *G01F 1/40* | (2006.01) |

(52) U.S. Cl.
CPC ............. *G05D 7/0635* (2013.01); *G01F 1/40* (2013.01); *G01F 1/6842* (2013.01); *G01F 5/00* (2013.01)

(58) Field of Classification Search
CPC .................................. G01F 1/42; G01F 5/005
See application file for complete search history.

(56) References Cited

U.S. PATENT DOCUMENTS

| | | |
|---|---|---|
| 5,576,498 A | 11/1996 | Shambayati |
| 6,619,142 B1 | 9/2003 | Förster et al. |
| 7,059,184 B2 | 6/2006 | Kanouda et al. |
| 2009/0045366 A1 | 2/2009 | Ito et al. |
| 2017/0153651 A1* | 6/2017 | Burgi ................... G01F 1/6842 |

FOREIGN PATENT DOCUMENTS

| | | |
|---|---|---|
| DE | 101 45 586 A1 | 4/2002 |
| EP | 0 876 588 B1 | 11/1998 |
| EP | 1 503 186 A1 | 2/2005 |
| EP | 2 098 834 A1 | 9/2009 |
| WO | WO 98/22782 A1 | 5/1998 |

* cited by examiner

*Primary Examiner* — Jewel V Dowtin
(74) *Attorney, Agent, or Firm* — Renner Otto Boisselle & Sklar, LLP

(57) ABSTRACT

A flow rate measuring unit, comprising a housing, which is composed of at least two housing parts that can be connected to one another and in which a flow passage extends, which branches off into a measuring channel branch and at least one bypass channel branch, wherein a substrate comprising a sensor system is disposed in the measuring channel branch. According to the invention, the flow passage includes a channel widening chamber in which an insert plate stack composed of at least two insert plates is disposed, which each include at least one plate-longitudinal recess extending in the longitudinal direction as the measuring channel branch and/or as the bypass channel branch. The insert plates are provided as insert parts for the channel widening chamber.

15 Claims, 11 Drawing Sheets

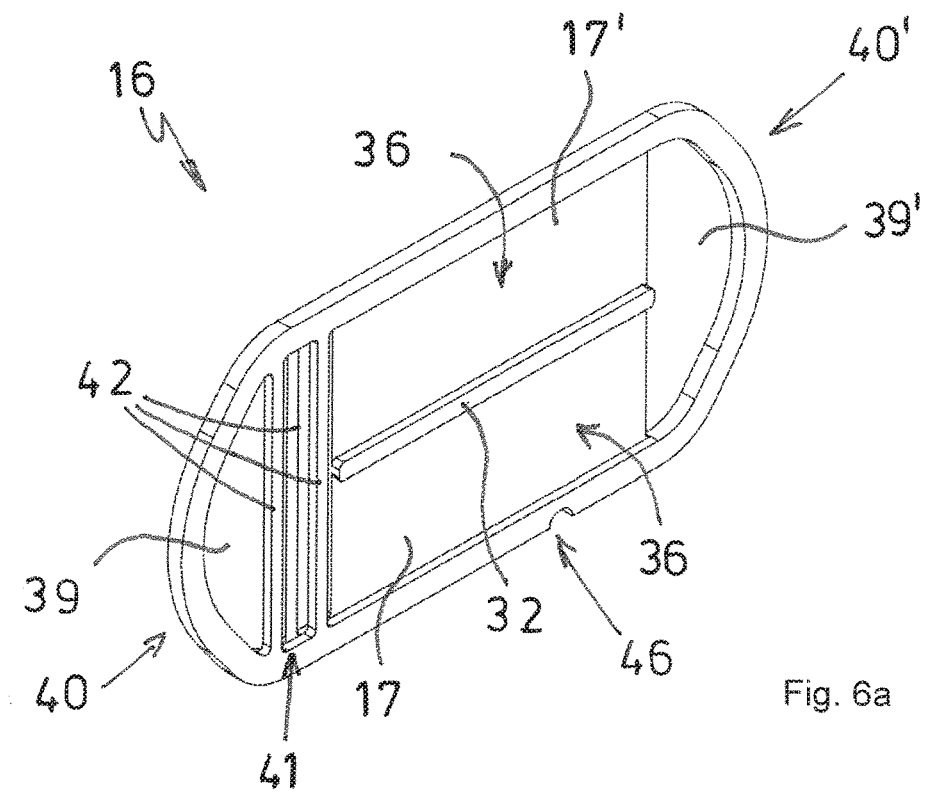
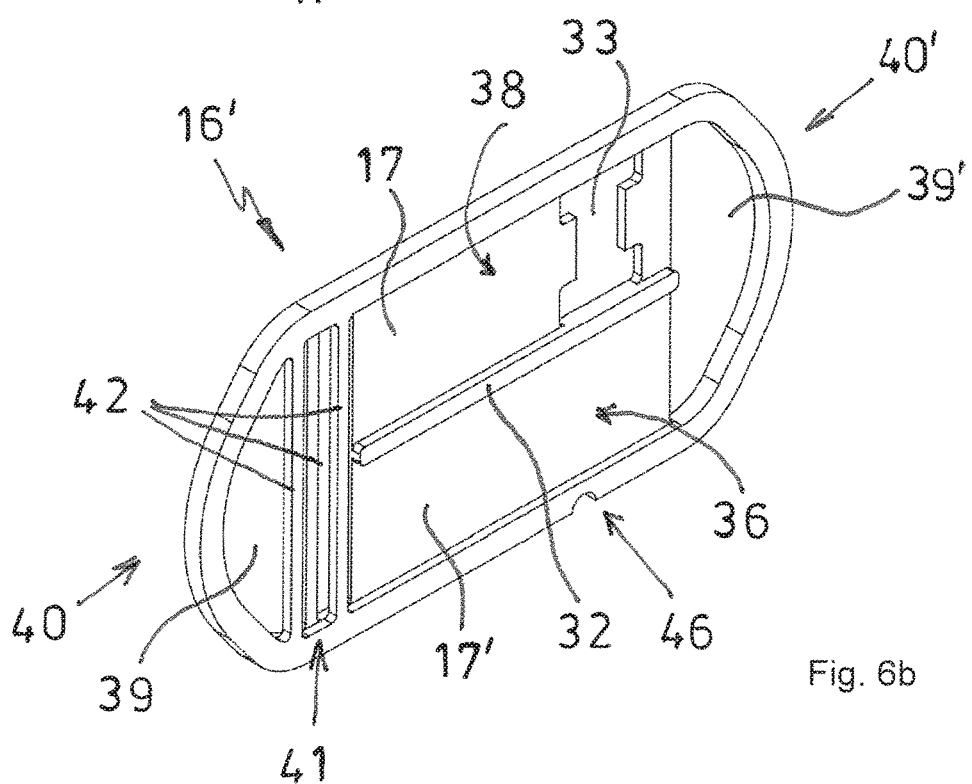

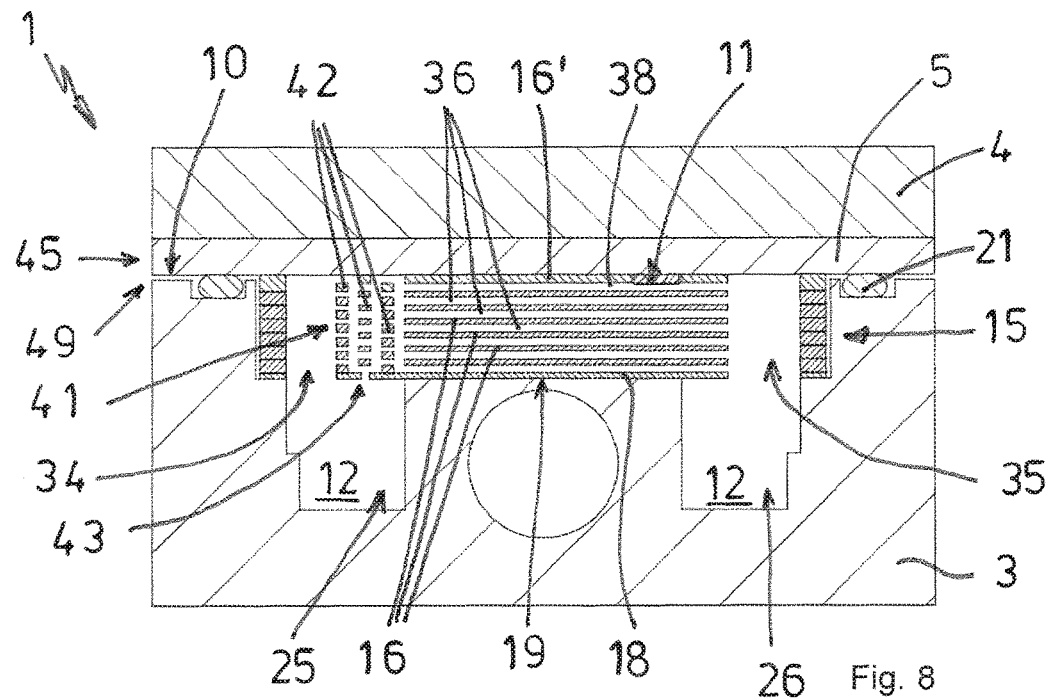
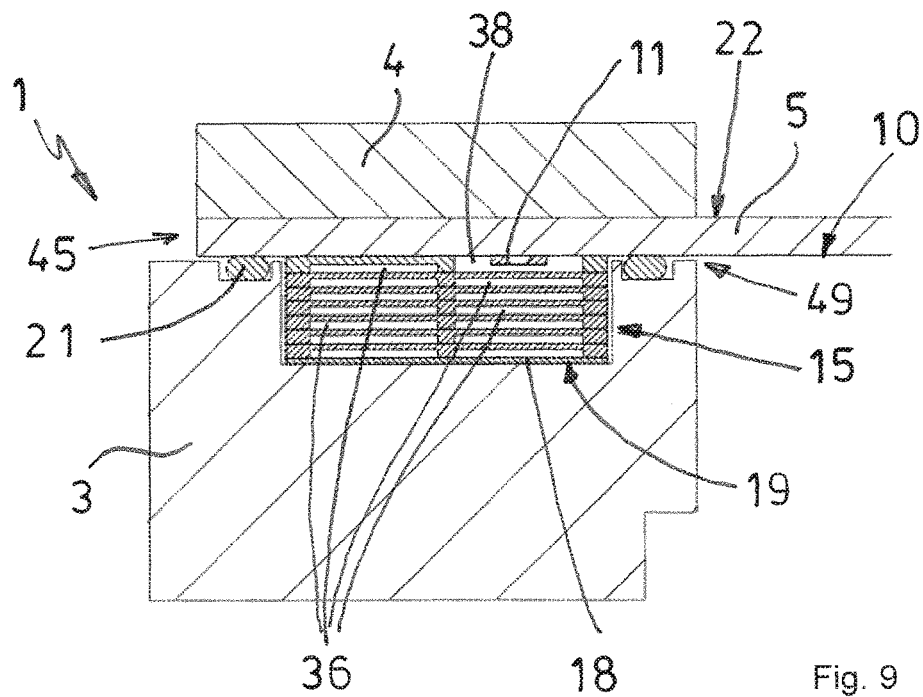

FLOW RATE MEASURING UNIT AND FLOW RATE CONTROL UNIT

CROSS-REFERENCE TO RELATED APPLICATION

The present application claims priority under 35 USC § 119 to German Patent Application No. 10 2015 120 792.3, filed Nov. 30, 2015, the entire disclosure of which is incorporated herein by reference.

TECHNICAL FIELD

The invention relates to a flow rate measuring unit for establishing the flow rate of a fluid, comprising a housing, which includes at least two housing parts that can be connected to one another and in which a flow passage extends at least in one of the housing parts from a housing inlet to a housing outlet, the flow passage comprising a measuring channel branch and at least one bypass channel branch in an intermediate region, wherein, in an intermediate region, the flow passage comprises a channel widening chamber in which an insert plate stack composed of at least two insert plates is disposed, which form the at least one bypass channel branch, and at least one electric sensor system disposed on a substrate is disposed on a wall of the measuring channel branch. In the channel widening chamber, the flow passage comprises a branch channel, from which the at least one bypass channel branch branches off orthogonally, and a mouth channel into which the at least one bypass channel branch opens orthogonally, wherein at least some of the insert plates in a center region have at least one plate-longitudinal recess extending in the longitudinal direction of the insert plates, serving as the bypass channel branch, and the channel widening chamber is sealed to the outside by way of a shapeable sealing element that is provided for sealing and disposed on at least one of the housing parts.

The invention further relates to a flow rate control unit for controlling the flow rate of a fluid, comprising a flow rate measuring unit, which comprises at least one measuring channel branch including an electric sensor system disposed on a substrate, and further comprising an electrically actuatable valve unit for controlling the fluid.

DESCRIPTION OF THE RELATED ART

Numerous devices for measuring the flow of a gaseous or liquid medium are known from the prior art. These generally comprise a housing having a flow passage that includes a main channel and a measuring channel branch connected in parallel to the main channel, wherein the main channel, which is frequently also referred to as bypass channel, has a cross-sectional surface area that is several times greater than that of the measuring channel branch. It is only possible to exactly establish the flow rate in the measuring channel branch if a laminar flow is present in the measuring channel branch comprising the sensor system. Turbulent flow effects in the bypass channel adversely affect the laminar flow in the measuring channel branch comprising the measuring sensor. Moreover, the transition from a laminar flow to a turbulent flow causes a sudden increase in the fluid flow in the measuring channel which is subject to hysteresis. So as to achieve a substantially laminar flow also in the bypass channel, it is customary to divide the bypass channel into a number of bypass channel branches that extend parallel to one another and that, in particular, are designed identically to one another, preferably corresponding, at least in the cross-sectional shape to the cross-sectional shape thereof, the measuring channel branch. By way of example, reference shall be made to the published prior art EP 0 876 588 B1 and EP 1 503 186 B1.

EP 0 876 588 B1 discloses a fluid flowmeter, comprising a housing, having an internal cavity, a fluid inlet at one end of the cavity, a fluid outlet at the other end of the cavity, flow sensing and indicating means communicating with the cavity through an opening in a first side of the housing, and a laminar flow module in the cavity, wherein the laminar flow module comprises a first plurality of flat plates that define multiple laminar flow passages extending between the inlet and outlet of the cavity in the housing for the main channel from which the measuring channel branch branches off laterally. The laminar flow module can be mounted through an opening on a second side of the housing located opposite the first side, wherein the first plurality of flat plates comprise a plurality of wires disposed thereon in spaced parallel relation so as to define the multiple laminar flow channels, and the laminar flow module further comprises a second plurality of plates disposed between the first plates, respectively. These plates form a plate stack, the plates of which are securely connected to one another in a stacked arrangement.

EP 1 503 186 B1 teaches a thermal flowmeter comprising a sensor channel, over which an electric sensor system is disposed, and a bypass channel with respect to the sensor channel, wherein a channel space is provided in a flow passage connecting the housing inlet and the housing outlet, the channel space forming the bypass channel and the sensor channel. A laminate, which is formed by a large number of thin sheets that each have an opening, is accommodated in the channel space. The laminate is adapted to dividing a fluid into a fluid portion flowing into the sensor channel and into a fluid portion flowing into the bypass channel. The laminate comprises mesh sheets, which are each formed by a thin sheet and have a mesh portion at the two ends of the sheet, wherein the mesh portions are connected to the housing inlet or the housing outlet, and the mesh sheets are laminated to one another by way of a spacer. The bypass channel is formed by a substrate that is in close contact with the housing part comprising the channel space so as to close the channel space including the laminate accommodated therein, wherein the sensor channel is defined by a groove extending between the substrate and the laminate.

The disadvantage of the above-described prior art is that the measuring channel branch is implemented separately in these solutions and formed, in each case, by a groove in the housing part or substrate part closing the cavity or the channel space. The measuring channel branch is thus defined by the recess of the housing part or substrate part used, and the geometry thereof cannot be readily modified. In contrast, the geometry of the bypass channel branches is easily variable in the known flow rate measuring units by using plate stacks or laminates having differing geometric designs.

SUMMARY

Flow rate control units for controlling the flow rates of a fluid in general are also known from the prior art, which comprise a flow rate measuring unit for establishing the flow rate of the fluid, and an electrically controllable, and in particular, adjustable, valve unit connected in series to the flow rate measuring unit for setting the flow rate of the fluid.

Proceeding from the above prior art, it is the object of the invention to propose an option in which the respective insert plates of the insert plate stack accommodated in the channel widening chamber are disposed so that the fluid flow to be measured essentially flows through the provided bypass channel branches and the measuring channel branch, and the channel widening chamber comprising the insert plate stack is sealed to the outside.

In the above-described flow rate measuring unit for establishing the flow rate of a fluid, it is provided, according to the invention, that the insert plates of the insert plate stack are pressed against one another in a sealed manner by the at least one other housing part, in the case of connected housing parts, wherein a housing gap is formed outside the channel widening chamber between the connected housing parts. The insert plates are situated on top of one another in a defined manner, and the insert plate stack is clamped between the at least two housing parts, forming a certain housing gap dimension. The insert plates include plate end regions that each have a plate aperture, wherein the plate apertures form the branch channel and the mouth channel in the insert plate stack, and the at least one bypass channel branch and the measuring channel branch branch off the branch channel and open into the mouth channel. This arrangement of the insert plates with respect to one another defines the flow path of the fluid. The arrangement and configuration of the insert plates ensure that cavities and clearances in the region around the insert plate stack and between the housing parts cannot act as parasitic channel branches, which can result based on the design or manufacturing tolerances, in so much as the plate recesses and apertures for the mouth channel, the branch channel, the bypass channel branches and the measuring channel branch are surrounded, and in particular enclosed, by plate regions in which the plates are supported on one another.

The insert plate stack preferably protrudes over the channel widening chamber in the housing part comprising the channel widening chamber, and/or the other housing part, which presses the insert plates of the insert plate stack against one another in a fluid-tight manner in the channel widening chamber, includes an elevation at least in the center, which defines a certain housing gap dimension of the housing gap at least between the at least two housing parts. This ensures that, in any case, sufficient pressure is exerted on the insert plates of the insert plate stack so as to press these against one another in a sealed manner and thereby bring about a defined flow path and a defined flow in the measuring channel branch and the at least one bypass channel branch.

In a preferred embodiment of the flow rate measuring unit according to the invention, at least one sealing shapeable sealing element is provided in the housing gap, preferably a sealing ring, a flat seal or an adhesive. This seals the housing gap around the channel widening chamber at least toward the outside.

In a preferred embodiment of the invention, the measuring channel branch is formed by at least one insert plate of the insert plate stack which includes at least one plate-longitudinal recess extending in the longitudinal direction of the insert plate, wherein the measuring channel branch extends parallel to the at least one bypass channel branch, and wherein, in the channel widening chamber, the measuring channel branch branches orthogonally off the branch channel and subsequently opens orthogonally into the mouth channel. The measuring channel branch and the at least one bypass channel branch extend next to and/or on top of one another. The measuring channel branch and the at least one bypass channel branch are thus part of the insert plate stack accommodated in the channel widening chamber. In this way, it is possible to provide a flow rate measuring unit in a simple manner that is adapted to differing fluids solely by installing or replacing the insert plate stack. The measuring channel branch is formed by at least one insert plate of the insert plate stack including at least one plate-longitudinal recess extending in the longitudinal direction of the insert plate, wherein the measuring channel branch extends parallel to the at least one bypass channel branch and, in the channel widening chamber, the measuring channel branch branches orthogonally off the branch channel and subsequently opens orthogonally into the mouth channel, and wherein the measuring channel branch and the at least one bypass channel branch extend next to and/or on top of one another. The substrate comprising the sensor system is preferably a semiconductor chip.

In the flow rate measuring unit according to the invention, the electrical connecting lines for the sensor system supported by the substrate can be routed in a sealed manner to the outside in any suitable location of the housing and/or between at least two housing parts in any suitable location of the housing. The connecting lines can be implemented as insulated strands or wires or as insulated conductors on or in a flexible plastic film and/or a flexible or rigid printed circuit board. The connecting lines can also comprise an interface to the outside that is designed as a plug connection, wherein the plug connection attached to the connecting lines is disposed in a fluid-tight manner with respect to the housing, and in particular the channel widening chamber, for example on one of the housing parts or a printed circuit board. Moreover, the plate apertures at the plate end regions of the insert plates of the insert plate stack may themselves be closed, or be open to the outside at least in one location. The respective insert plates of the insert plate stack can include one or more plate-longitudinal recesses, wherein multiple plate-longitudinal recesses are advantageous for forming a number of bypass channel branches. In principle, it is also possible to combine insert plates having a differing number of plate-longitudinal recesses with one another for the insert plate stack.

If the insert plate stack comprises at least two insert plates including plate-longitudinal recesses for forming the measuring channel branch and multiple bypass channel branches, the measuring channel branch and the bypass channel branches preferably branch off the branch channel at a distance from one another, and preferably open into the mouth channel likewise at a distance from one another, wherein at least the inlet regions of the measuring channel branch disposed in the branch channel and the at least two bypass channel branches are advantageously designed to be identical. However, it has proven to be advantageous to also design the outlet regions of the measuring channel branch and of the at least two bypass channels with identical shapes. In this way, it is achieved that the laminar flow in the measuring channel branch and the bypass channel branches is not only identical, but also optimal. This measure avoids disturbing influences on the laminar flow in the measuring channel branch, in particular in the region of the electric sensor system disposed on the substrate. As a result, the incident flows against the inlet regions of the measuring channel branch and of the bypass channel branches that branch orthogonally off the branch channel and extend parallel to one another are identical. The same applies to the outlet regions of the measuring channel branch and the bypass channel branches opening into the mouth channel.

In an advantageous embodiment of the flow rate measuring unit according to the invention, the insert plate stack comprises at least two different types of insert plates, which are disposed in alternating sequence, wherein one type is designed as a flat insert plate having no plate-longitudinal recesses, and the other type is designed as a flat insert plate having plate-longitudinal recesses designed as plate-longitudinal apertures.

In another advantageous embodiment of the flow rate measuring unit according to the invention, the insert plate stack comprises only one type of insert plates, which are designed as profiled insert plates having plate-longitudinal recesses implemented as plate-longitudinal grooves.

In a preferred embodiment of the invention, preferable, at least the uppermost insert plate located closest to the substrate comprising the sensor system has at least two groove-like plate-longitudinal recesses extending parallel to one another, one of which forming the measuring channel branch and at least one other forming one of the bypass channel branches. It is clear with such an embodiment that the substrate comprising the electric sensor system is disposed eccentrically, with respect to the channel widening chamber, so that this is positioned aligned only with the measuring channel branch. The sensor system supported by the substrate does not project, or projects only minimally, into the measuring channel branch so as not to disturb the laminar flow there. The sensor system is preferably disposed aligned with a wall of the measuring channel branch, or minimally offset with respect to the wall of the measuring channel. The at least one plate-longitudinal recesses of at least two insert plates that determine the measuring channel branch and/or at least one bypass channel branch can, in principle, have an identical or a differing cross-sectional shape. In a preferred embodiment of the invention, the plate-longitudinal recesses of the insert plate which form the measuring channel branch and at least one bypass channel branch and/or the plate-longitudinal recesses of the at least one further insert plate which form only bypass channel branches have an identical cross-sectional shape. The more bypass channel branches are provided in an insert plate, the better the laminar flow in the bypass channel branches and in the measuring channel branch will be, and the greater the overall flow capacity of the flow rate measuring unit will be.

In a particularly preferred embodiment of the flow rate measuring unit according to the invention, all insert plates of the insert plate stack are designed identically at least in terms of the contour thereof, wherein the measuring channel branch and the at least one bypass channel branch have an identical cross-sectional shape and an identical length. This has a positive effect, in particular, on the manufacturing costs for the insert plate stack, and additionally simplifies the assembly thereof. In an advantageous variant of this embodiment, multiple insert plates are provided, which have only at least one bypass channel, wherein these insert plates in the insert plate stack are designed identically to one another, and the insert plate in the insert plate stack including at least the measuring channel branch has a design that deviates from the other insert plates disposed therebeneath and/or thereabove. The measuring channel branch formed in the uppermost insert plate can thus be optimally designed, regardless of the flow rate flowing through the bypass channel branches.

In a preferred embodiment of the invention, an end face of the insert plate stack which faces away from the substrate comprising the sensor system is supported on a stack support plate, which is disposed on a bottom of the channel widening chamber. The stack support plate is preferably flat and designed to be identical to the insert plates of the insert plate stack, at least in terms of the contour. This stack support plate extends into the branch channel and the mouth channel of the channel widening chamber above an inlet opening, provided for the fluid, into the channel widening chamber and above an outlet opening, provided for the fluid, out of the channel widening chamber.

In an advantageous embodiment of the invention, the insert plates of the insert plate stack comprise at least one turbulence filter, which is integrally formed on the respective insert plate, and which is disposed, in each case, upstream of the measuring channel branch and/or the bypass channel branches of the insert plate in the plate aperture at, or close to, the inlet regions of the plate-longitudinal recesses, and extends into the branch channel, wherein the turbulence filter is designed as at least one plate-transverse lamella or as a plate mesh. The turbulence filter improves the uniform distribution of the fluid across the measuring channel branch and the bypass channel and, in particular, the bypass channel branches thereof. This substantially compensates for possible turbulences occurring in the branch channel. The at least one plate-transverse lamella or the plate mesh is preferably disposed vertically offset from the plate-longitudinal recesses of the respective insert plate. The vertical offset is typically approximately half the thickness of the insert plates. This increases the efficiency of the turbulence reduction.

In a preferred embodiment of the invention, the flow passage is provided only in one of the housing parts, and thus the channel widening chamber is provided only in the housing part comprising the flow passage, wherein the electrical connecting lines for the substrate comprising the electric sensor system are routed out of the housing between one of the housing parts and the shapeable sealing element provided for sealing the channel widening chamber. This means that the insert plate stack is accommodated only in one of the housing parts. The channel widening chamber can be closed in a sealed manner by way of the at least one second housing part by joining the two housing parts, for example by way of a screw, rivet, detent or clamp joint. The other housing part can thus particularly easily be designed as a flat plate.

In a particularly preferred embodiment, a printed circuit board, which carries at least the substrate comprising the sensor system and comprises the connecting lines, is disposed between the housing part comprising the channel widening chamber and the at least one other housing part, wherein the deformable sealing element is disposed between the housing part comprising the channel widening chamber and the printed circuit board. The printed circuit board extends in the housing gap between the housing parts, wherein the other housing part presses the printed circuit board against the housing part comprising the channel widening chamber. The printed circuit board extends across the channel widening chamber and at least also the sealing element. In this way, the printed circuit board closes the channel widening chamber of the one housing part toward the outside in a sealed manner, wherein the printed circuit board is supported on the other housing part. Moreover, this laterally closes the measuring channel branch and the at least one bypass channel branch with respect to one another in a fluid-tight manner. In particular, the other housing part presses the printed circuit board against the insert plate stack, and presses the stack directly or indirectly against the housing part comprising the channel widening chamber, wherein a defined housing gap dimension is maintained between the printed circuit board and the housing part comprising the channel widening chamber. As was described above, fluid-tight, in connection with the insert plates, shall be understood to mean such as to ensure that no parasitic channel branch forms.

Moreover, in a further preferred embodiment, the electrical connecting lines for the substrate comprising the sensor system are routed in the printed circuit board at least in the region of the at least one shapeable sealing element sealing the housing gap. This allows, in particular, for simple, permanently pressure-tight connection of the printed circuit board to the housing part comprising the channel widening chamber, without additional sealing measures. In one embodiment of the invention, the printed circuit board preferably also has a central thickening in the region of the channel widening chamber, by way of which the printed circuit board closes the channel widening chamber, preloaded by the other housing part. The thickening can be implemented as an overlay on the back side of the printed circuit board or as an insert in the printed circuit board, for example, it can be provided as a provided plating. By preloading the printed circuit board by way of the second housing part, this can absorb the pressure of the flowing fluid to be measured without difficulty, without bending, so as to preclude a disadvantageous increase in the cross-section of the measuring channel branch. In this way, exact measurement of the flow rate of the flow rate measuring unit can be ensured, regardless of the pressure of the fluid to be measured.

The housing part, which presses the printed circuit board against the housing part comprising the channel widening chamber having the insert plate stack accommodated therein, and/or the printed circuit board, which is supported on this housing part, preferably have a defined housing gap dimension with respect to the housing part comprising the channel widening chamber, at least in the region of the sealing element. This ensures that the insert plates of the insert plate stack are pressed against one another, and optionally against the stack support plate.

In a further preferred embodiment of the invention, the printed circuit board is disposed between two insert plates of the insert plate stack and divides the insert plate stack and the channel widening chamber, wherein the printed circuit board includes through-conducting openings for the fluid in the region of the branch channel or of the mouth channel. Accordingly, the two housing parts abutting the printed circuit board each include a channel widening chamber section. Any arbitrary number of insert plates can be disposed on either side of the printed circuit board. The depth of the two channel widening chamber sections in the housing parts accommodating the insert plate stack thus depends on the respective number of insert plates and the thickness.

The insert plates of the insert plate stack, and ideally also the stack support plate, are preferably stamped, embossed and/or etched metal strips, and preferably sheet metal strips. In this way, the insert plates can be implemented in a simple and cost-effective manner with a wide variety of plate-longitudinal recesses, plate apertures, and turbulence filters. It is also possible, of course, to use metal strips having a greater thickness for the production of the insert plates, which are appropriately formed by way of broaching, drilling, milling or other machining steps.

The flow rate control unit according to the invention for controlling the flow rate of a fluid in general comprises a flow rate measuring unit for establishing the flow rate of the fluid, and at least one electrically controllable valve unit connected in series to the flow rate measuring unit for setting the flow rate of the fluid. The flow rate measuring unit comprises a flow passage branching into a measuring channel branch and at least one bypass channel branch, wherein the measuring channel branch comprises an electric sensor system disposed on a substrate, which like the valve unit is electrically connected to an electronic control unit. According to the invention, the flow rate control unit comprises a flow rate measuring unit according to the invention as described above. The valve unit can be designed as a valve switching unit or as a valve regulating unit. This means that the valve unit is designed either so as only to switch on and off the flow of the fluid through the flow passage, or so as to control or regulate the rate thereof.

BRIEF DESCRIPTION OF THE DRAWINGS

The invention will be described hereafter in greater detail based on two exemplary embodiments, which are illustrated in the drawings. Additional features of the invention will be apparent from the following description of the exemplary embodiments of the invention in conjunction with the accompanying drawings. In the drawings:

FIGS. 6a-6c show the individual insert plates of the insert plate stack from FIG. 3 separately from one another;

FIG. 8 shows a longitudinal sectional view of the flow rate measuring unit from FIG. 1;

FIG. 9 shows a cross-sectional view of the flow rate measuring unit from FIG. 1;

FIG. 13b shows an insert plate with plate-longitudinal recesses.

DETAILED DESCRIPTION OF THE INVENTION

Figure 1:
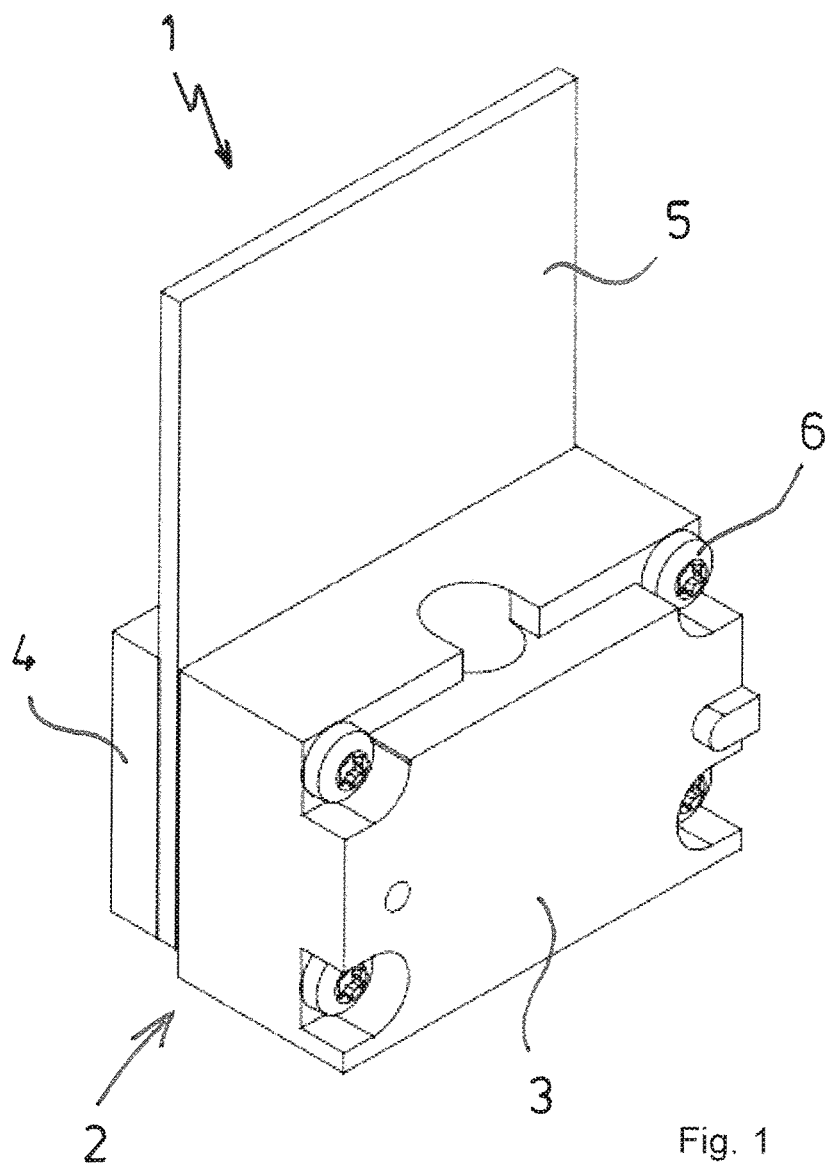
FIG. 1 shows a perspective view of a flow rate measuring unit according to the invention, comprising a printed circuit board disposed between two housing parts, and an insert plate stack, which is accommodated in a channel widening chamber of a housing part and is supported at the end face on the printed circuit board.

FIG. 1 shows a perspective illustration of a flow rate measuring unit 1 according to the invention, comprising a housing 2, which is composed of two housing parts 3, 4, between which a printed circuit board 5 is disposed. The printed circuit board 5 is held between the housing parts 3, 4 by four tension screws 6 by the larger housing part 3 being screwed to the smaller housing part 4. The printed circuit board 5 is larger than the housing parts 3, 4 and protrudes over the housing 2 on one side.

Figure 2:
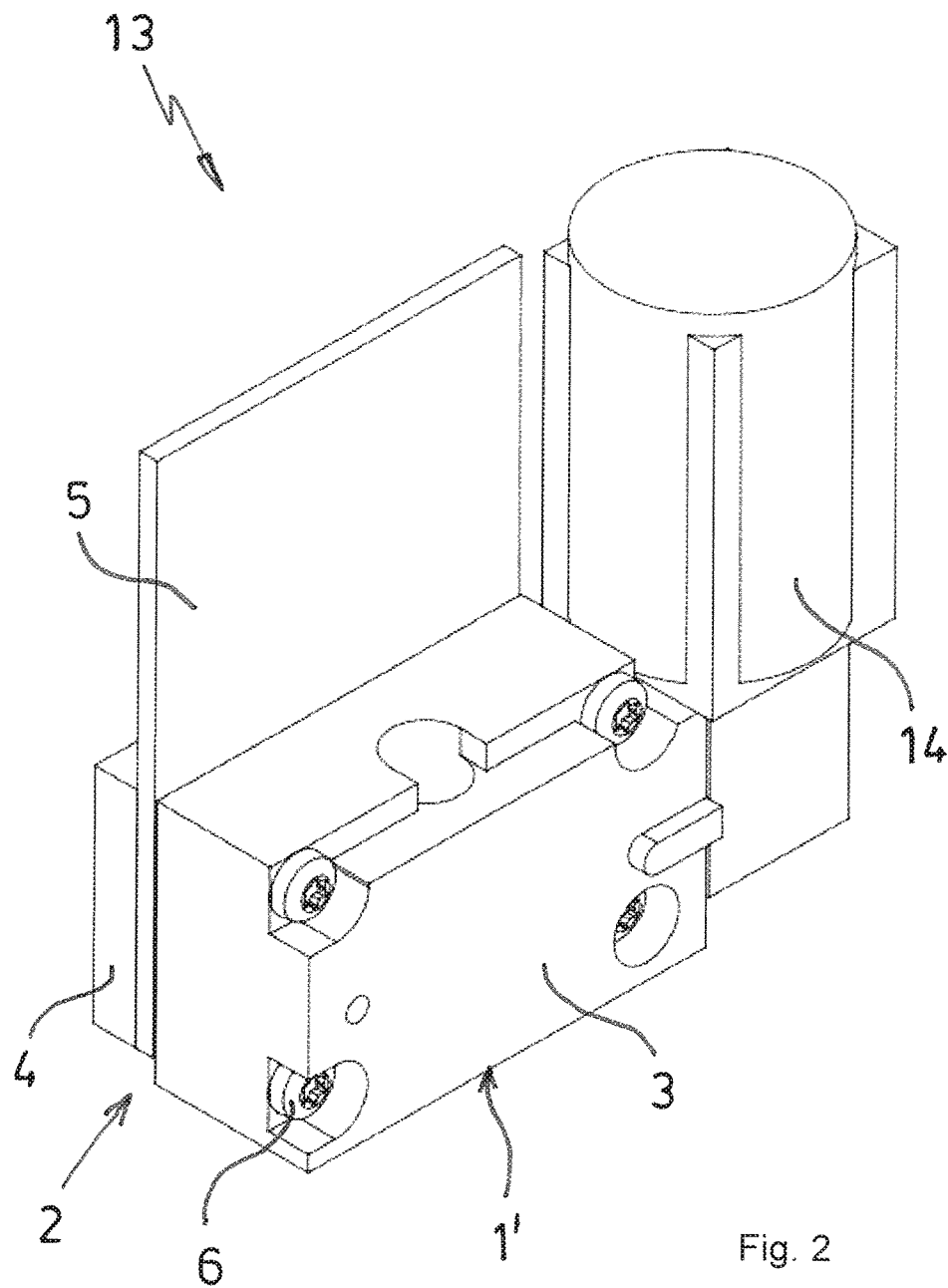
FIG. 2 shows a perspective view of a flow rate control unit according to the invention comprising a variant of the flow rate measuring unit according to FIG. 1.

FIG. 2 shows a flow rate control unit 13 according to the invention, which comprises a flow rate measuring unit 1' designed similarly to the above-described flow rate measuring unit 1, and a valve unit 14. The valve unit 14 is connected in series with the flow rate measuring unit 1'. This is preferably an electrically controllable valve unit 14, which can be used to control and regulate the flow rate of the fluid. To this end, the valve unit 14 is electrically connected to an electronic control unit, which is not shown in FIG. 2 and to which, in turn, the sensor system of the substrate 11 is directly or indirectly connected.

Figure 3:
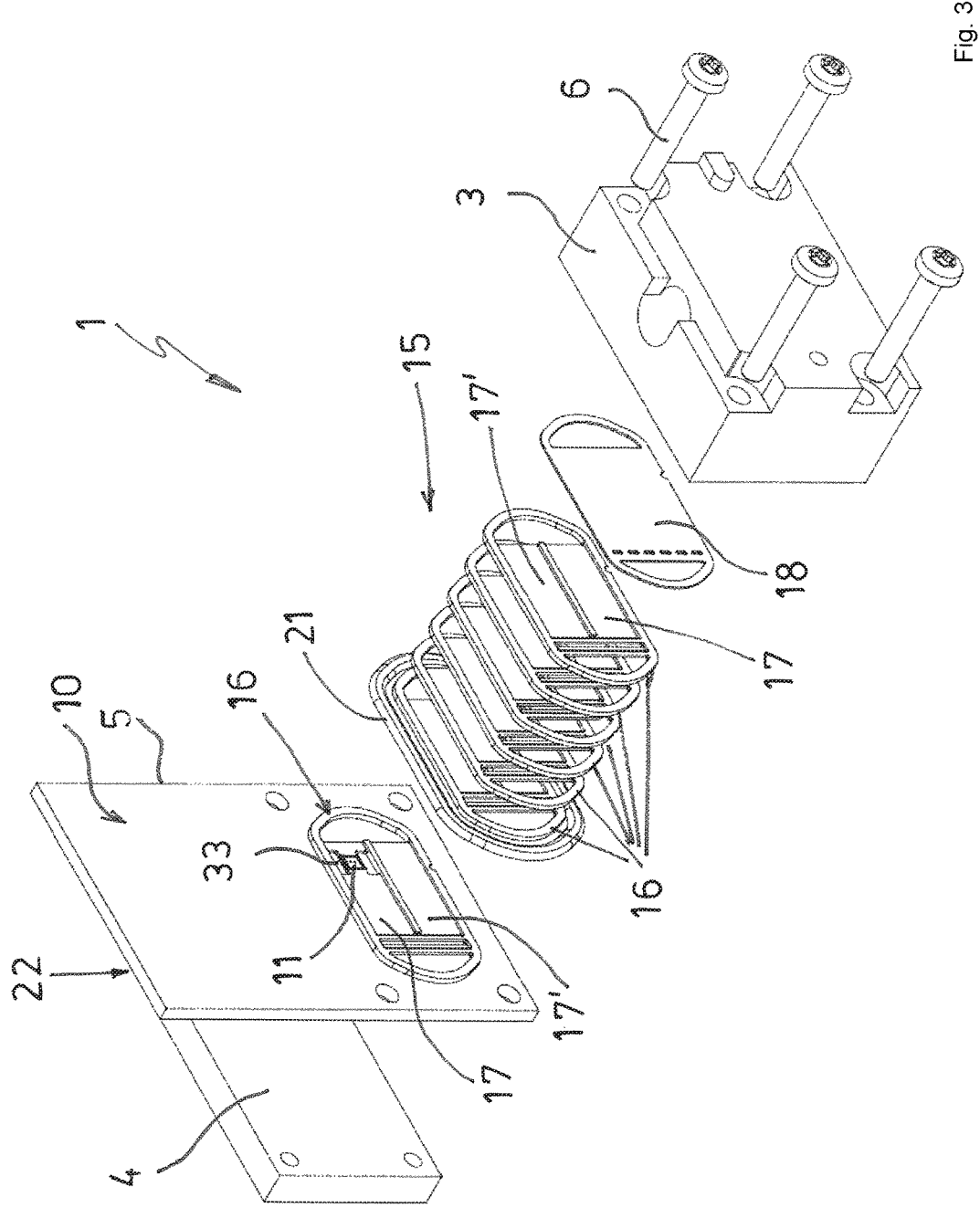
FIG. 3 shows an exploded view of the flow rate measuring unit from FIG. 1.

FIG. 3 shows an exploded view of the flow rate measuring unit from FIGS. 1 and 2. In this illustration, all components of the flow rate measuring unit 1, 1' accommodated in the housing part 3 are visible. These components include an insert plate stack 15, which in the shown exemplary embodiment is composed of seven substantially identical insert plates 16, 16', each having two groove-like plate-longitudinal recesses 17, 17'. The uppermost insert plate 16' differs from the six insert plates 16 located therebeneath only that, in this case, in one of the plate-longitudinal recesses 17, 17' a plate window 33 is present in the plate-longitudinal recesses 17.

The insert plates 16, 16' are oriented such that the plate-longitudinal recesses 17, 17' each point in the direction of the larger housing part 3, which is to say that they are open there. The respective plate-longitudinal recesses 17, 17' of an insert plate 16, 16' are each closed by the insert plate 16, 16' disposed closest thereto, so that these form closed flow ducts in the circumferential direction. A stack support plate 18 is provided between the housing part 3 and the insert plate stack 15 which, on the inside thereof, is seated against a bottom 19 of the housing 3 visible in FIG. 4 when assembled, and on which the insert plate stack 15 is supported with the end face facing away from the substrate 11. This stack support plate 18, which has a flat design, closes the plate-longitudinal recesses 17, 17' of the lowermost insert plate 16 of the insert plate stack 15. The insert plate stack 15 comprising the stack support plate 18 disposed therebeneath is disposed between the printed circuit board 5 and the bottom 19 of the housing part 3, and these are pressed against one another when the two housing parts 3, 4 are screwed together. On the first flat side 10 facing the larger housing part 3, the printed circuit board 5 carries a substrate 11 comprising a sensor system. The substrate 11 is formed by a semiconductor chip. The insert plates 16 and 16' and the stack support plate 18 are individually shown in an enlarged view in FIGS. 6a to 6c and will be described hereafter again in greater detail. A sealing element 21, in the form of a sealing ring sealing the channel widening chamber 12 with respect to the printed circuit board 5, is disposed between the housing part 3 and the printed circuit board 5. The sealing element 21 encloses the insert plate 16' and the substrate 11 comprising the sensor system. This is pressed against the printed circuit board 5 when the larger housing part 3 is screwed to the other smaller housing part 4 and reliably prevents fluid from exiting in this area. The housing part 4 is designed as a flat plate on which the printed circuit board 5 is supported with the second flat side 22 thereof.

Figure 4A:
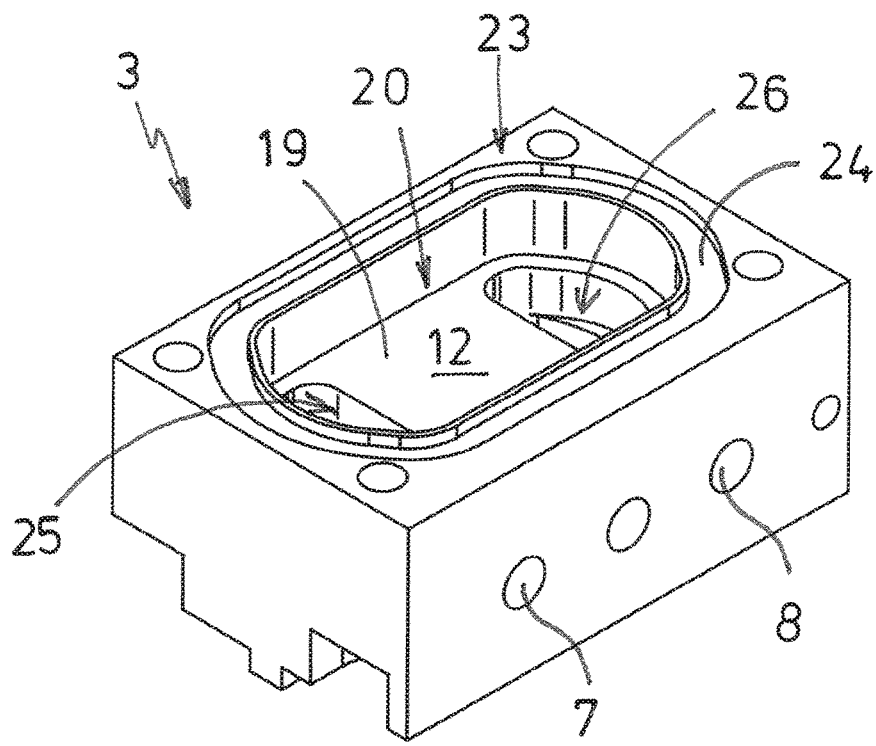
FIG. 4a shows the larger housing part of the flow rate measuring unit from FIG. 1

FIG. 4a shows the large housing part 3 from FIG. 1 with a view onto the inner side of the housing 2, which is to say onto the side facing the printed circuit board 5. This housing part 3 comprises a housing inlet 7 and a housing outlet 8, between which extends a flow passage 9, for the fluid to be measured, which is only partially visible in FIG. 4. The housing inlet 7 and the housing outlet 8 are disposed on the side of the housing part 3 comprising a channel widening chamber 12, which extends centrally and symmetrically as a housing section 20 in the housing part 3. The housing side 23 of the housing part 3 toward which the channel widening chamber 12 is open includes a receiving groove 24 for the sealing element 21 which surrounds the channel widening chamber 12 on the outside. An inlet opening 25 and an outlet opening 26 for the fluid, from which the flow passage 9 extends further to the housing inlet 7 or to the housing outlet 8, which is not visible in this figure, are provided in the bottom 19 of the channel widening chamber 12.

Figure 4B:
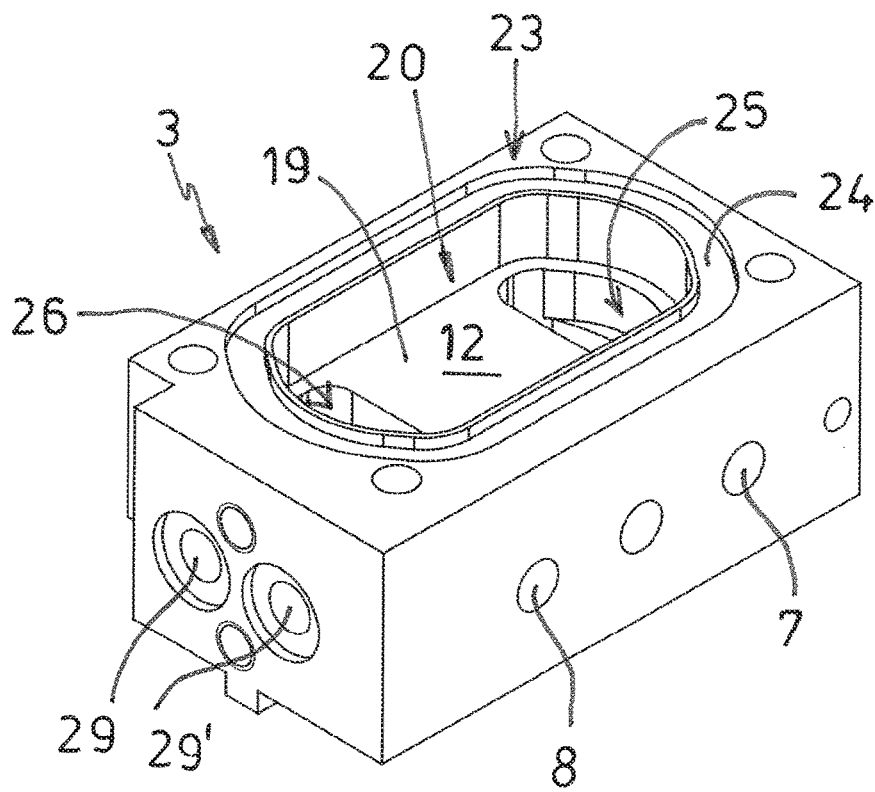
FIG. 4b shows the larger housing part of the flow rate measuring unit from FIG. 1 in a top illustration onto the inner side.

FIG. 4b shows the large housing part 3 from FIG. 2 with a view onto the inner side of the housing 2, which is to say onto the side facing the printed circuit board 5. This housing part 3 comprises a housing inlet 7 and a housing outlet 8, which are disposed on the longitudinal side of the housing part 3 comprising the channel widening chamber 12. In addition, the housing part 3 on the end face also has two juxtaposed fluid through-passages 29, 29', by way of which the valve unit 14 shown in FIG. 2 can be fluidically connected.

Figure 5A:
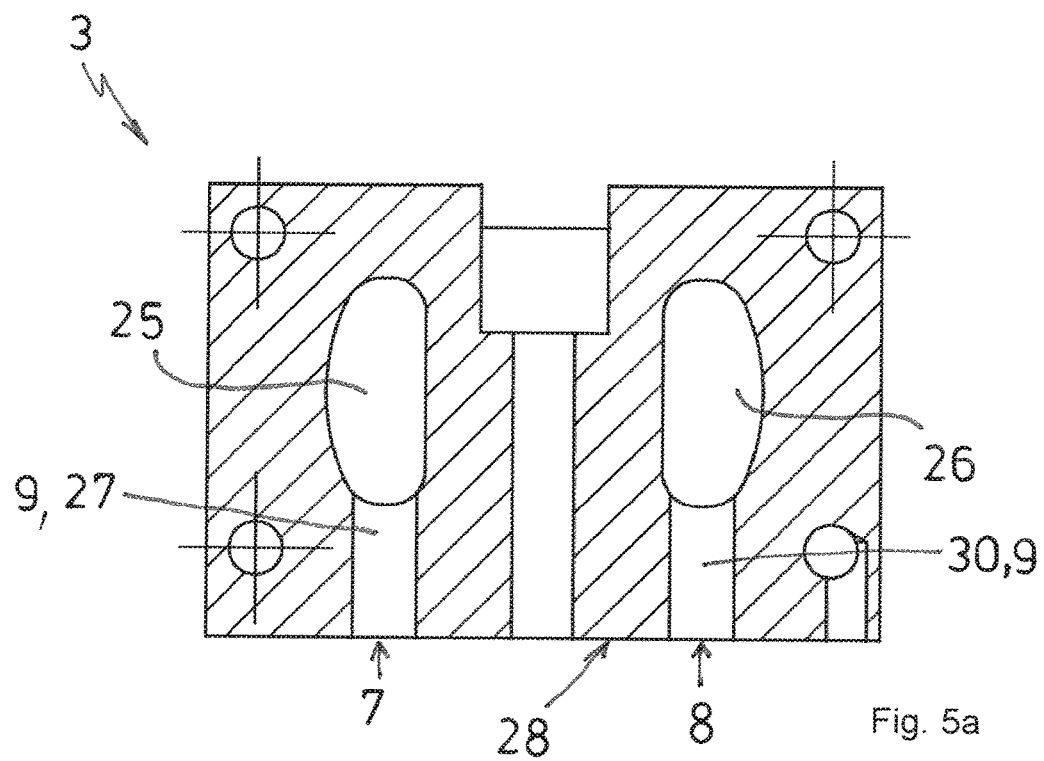
FIGS. 5a-5b shows the larger housing part of the flow rate measuring unit from FIG. 1 (FIG. 5a) and of the flow rate measuring unit of the flow rate control unit from FIG. 2 (FIG. 5b), in a longitudinal sectional view.
Figure 5B:
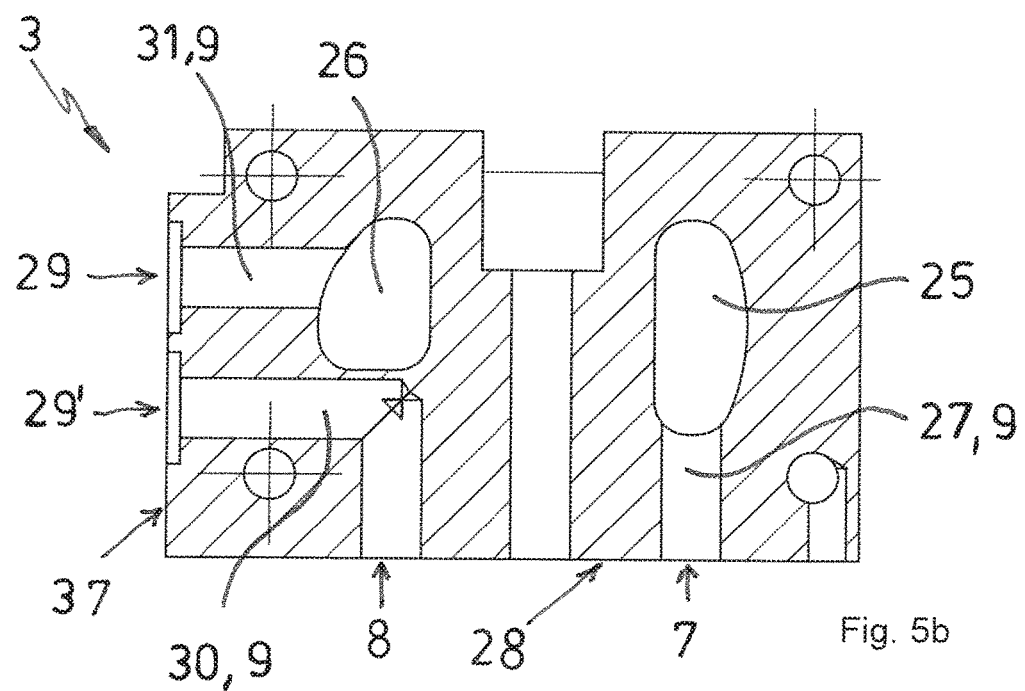

FIGS. 5a and 5b show two different variants of the larger housing 3, each in a longitudinal sectional illustration in a plane beneath the bottom 19 of the channel widening chamber 12 of the housing 3. The respective cutting plane is determined by the plane spanned by the center lines of the housing inlets 7 and the housing outlets 8. The first variant depicted in FIG. 5a shows a flow rate measuring unit 1 to which no valve unit 14 is flange-mounted, and the second variant illustrated in FIG. 5b shows a flow rate control unit 13 comprising a flow rate measuring unit 1' according to the invention and a valve control unit 14. These figures show the specific progression of the flow passage 9 in the housing part 3.

In the first variant according to FIG. 5a, a front subsection 27 of the flow passage 9 leads from the housing inlet 7 disposed on a longitudinal lateral face 28 of the housing part 3 to the inlet opening 25 of the channel widening chamber 12. A rear subsection 30 of the flow passage 9 extends from the outlet opening 26 of the channel widening chamber 12 to the housing outlet 8. Together with the channel widening chamber 12, the subsections 27, 30 form the flow passage 9 through the housing 2 of the flow rate measuring unit 1.

In the second variant according to FIG. 5b, a front subsection 27 of the flow passage 9 likewise leads from the housing inlet 7 disposed on a longitudinal lateral face 28 of the housing part 3 to the inlet opening 25 of the channel widening chamber 12. A central subsection 31 of the flow passage 9 extends from the outlet opening 26 of the channel widening chamber 12 to a first fluid through-passage 29 provided on an end lateral face 37 of the housing part 3. Next to this fluid through-passage 29, a second fluid through-passage 29' is provided, from which a rear subsection 3 of the flow passage 9 leads to the housing outlet 8. Together with the channel widening chamber 12, the subsections 27, 30, 31 form the flow passage 9 through the housing 2 of the flow rate measuring unit 1'. The center subsection 31 and the rear subsection 30 of the flow passage 9 can be joined to one another on the end lateral face 37 of the housing part 3 by way of the fluid through-passages 29, 29' by the end lateral face 37 being flange-mounted, for example, to a suitably designed valve unit 14, as is shown in FIG. 2.

FIG. 6a shows an individual insert plate 16 of the insert plate stack 15, which forms only flow channel branches 36. The two plate apertures 39, 39' on the plate end regions 40, 40' of the insert plate 16 are now easily visible, forming the branch channel 34 or mouth channel 35 shown in FIG. 7 when the insert plates 16 are stacked on top of one another. Furthermore, the two plate-longitudinal recesses 17, 17' are easily visible in this view, which in this exemplary embodiment are formed in a center region 46 of the insert plates 16 and separated from one another by a centrally disposed plate-longitudinal rib 32. The plate-longitudinal recesses 17, 17' are designed as plate-longitudinal grooves 17, 17' and are connected directly at the ends to the plate apertures 39, 39. The plate aperture 39 is assigned to the branch channel 34, and the plate aperture 39' is assigned to the mouth channel 35. In the plate aperture 39, a turbulence filter 41, which is formed by three plate-transverse lamellae 42, is disposed in front of the plate-longitudinal recesses 17, 17'. The plate-transverse lamellae 42 are spaced apart from one another in the longitudinal direction of the insert plate 16 and, as is clearly apparent from FIG. 8, have a vertical distance from one another perpendicularly to the insert plate 16. The other plate aperture 39' of the insert plate 16 does not comprise such a turbulence filter 41 in this exemplary embodiment. However, one may optionally also be provided there.

FIG. 6b shows the top insert plate 16' of the insert plate stack 15 of the flow rate measuring unit 1 according to FIG. 3, which is designed corresponding to the insert plate 16 in terms of the contour shape. The insert plate 16' differs from the insert plate 16 only by the plate window 33, which is provided for accommodating the substrate 11 comprising the sensor system. The plate window 33 is introduced into the plate-longitudinal recess 17 as an aperture forming the measuring channel branch 38. The plate-longitudinal recess 17' forms one of the bypass channel branches 36.

Figure 6C:
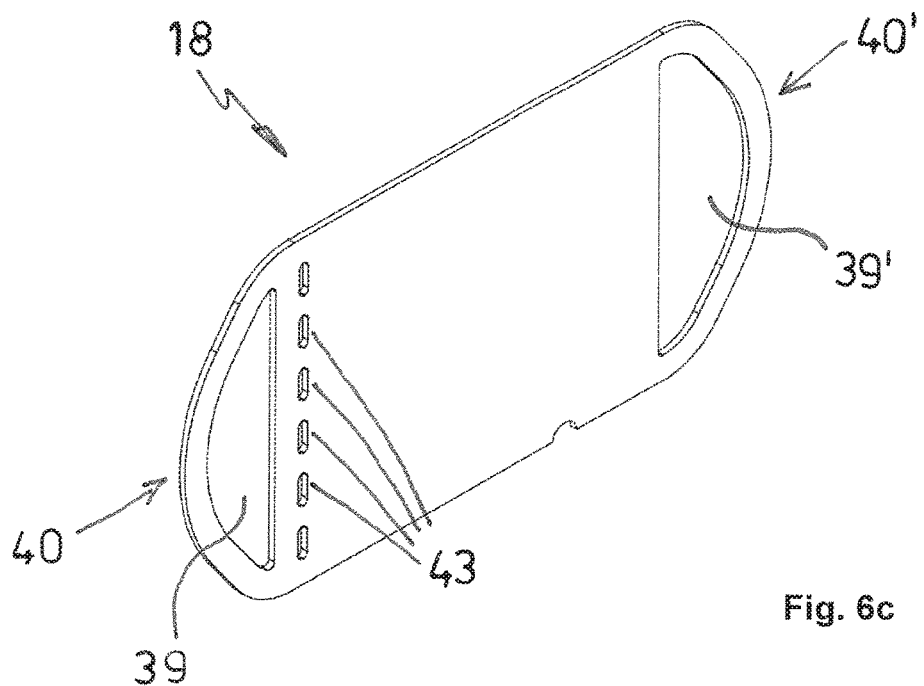

FIG. 6c shows the stack support plate 18, which corresponds to the insert plates 16, 16' in terms of the outer contour. The stack support plate 18 has a flat design, which is to say it has no plate-longitudinal recesses and includes plate apertures 39, 39' on the plate end regions 40, 40' corresponding to the insert plates 16, 16'. No turbulence filter 41 in the form of plate-transverse lamellae 42 is provided on the plate aperture 39. Instead, a number of passage windows 43 are provided in this area, which are disposed beneath the plate-transverse lamellae 42 of the insert plate stack 15.

Figure 7:
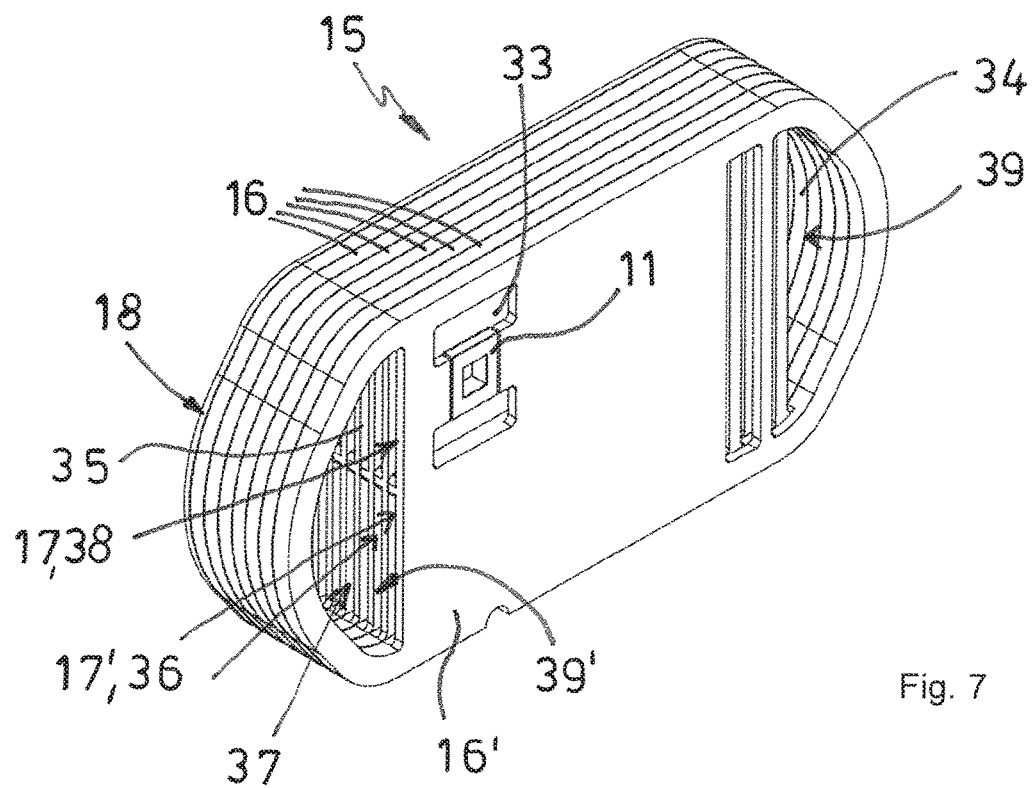
FIG. 7 shows the insert plate stack from FIG. 3.

FIG. 7 shows the insert plate stack 15 of the flow rate measuring unit 1, which is formed by the insert plates 16, 16' and disposed on the stack support plate 18. The stack support plate 18 and the insert plates 16, 16' are seated directly and loosely on top of one another and are pressed against the printed circuit board 5 by the housing part 3, and against one another by the printed circuit board 5, only when the housing 2 is assembled. The uppermost insert plate 16' includes a plate window 33 for accommodating the substrate 11 comprising the sensor system. The plate apertures 39 of the insert plate stack 15 form the branch channel 34, and the plate apertures 39' of the insert plate stack 15 form the mouth channel 35, which connect to the inlet opening 25 or the outlet opening 26 of the channel widening chamber 12 when the flow rate measuring unit 1 is installed, wherein the branch channel 34 is assigned to the inlet opening 25, and the mouth channel 35 is assigned to the outlet opening 26 of the channel widening chamber 12. The plate-longitudinal grooves 17, 17' of the insert plates 16 form bypass channel branches 36 for the measuring channel branch 38. The groove-like plate-longitudinal recess 17 of the top insert plate 16' forms the measuring channel branch 38, on the wall of which the substrate 11 comprising the sensor system is disposed, and the second groove-like plate-longitudinal recess 17' of the top insert plate 16' forms a further bypass channel branch 36 to the bypass channel branches 36 of the insert plates 16.

It is also possible to dispose the insert plate stack 15 so that the plate-longitudinal recesses 17, 17' of the insert plates 16, 16' do not point to the bottom 19 of the channel widening chamber 12, but in the opposite direction, which is to say in the direction of the printed circuit board 5. In this case, the plate window 33 in the top insert plate 16' can be dispensed with, so that all insert plates are completely identical. The substrate 11 comprising the sensor system, however, then protrudes into the measuring channel branch 38 formed by a plate-longitudinal recess 17 of the uppermost insert plate 16'. However, this is disadvantageous for a laminar flow in the measuring channel branch 38. This problem can be solved, however, by installing the substrate 11 comprising the sensor system recessed into the printed circuit board 5. In this case, the stack support plate 18 is not absolutely necessary, if the bottom 19 of the channel widening chamber 12 is suitable configured.

FIG. 8 shows a longitudinal sectional view of the flow rate measuring unit 1 from FIG. 1. The housing parts 3, 4 are disposed layered on top of one another, with the printed circuit board 5 interposed, wherein the housing part 3 comprising the channel widening chamber 12 is screwed (not visible) to the other housing part 4. The housing part 4 presses the printed circuit board 5 against the insert plate stack 15 formed of the insert plates 16, 16', and presses this stack against the stack support plate 18 and the housing part 3, wherein the sealing element 21 seals the channel widening chamber 12 to the outside. A housing gap 45 is formed between the connected housing parts 3, 4 outside the channel widening chamber 12, wherein the insert plates 16, 16' in the channel widening chamber 12 are situated on top of one another in a defined manner, and the insert plate stack 15 is clamped between the two housing parts 3, 4, forming the housing gap 45, and the sealing element 21 is pressed between the housing part 3 and the printed circuit board 5, forming a certain housing gap dimension 49. As is apparent from FIG. 5a, the bottom 19 of the housing 3 has an inlet opening 25 into and an outlet opening 26 out of the channel widening chamber 12, wherein the inlet opening 25 is connected to the front subsection 27, and the outlet opening 26 is connected to the rear subsection 30 of the flow passage 9. The stack support plate 18, which carries an insert plate stack 15 composed of seven insert plates 16, 16', is disposed on the bottom 19 of the housing part 3. The illustrated section extends through the substrate 11 comprising the sensor system and shows the measuring channel branch 38 and the bypass channel branches 36 disposed beneath the measuring channel branch. The branch channel 34, on which the flow passage 9 branches off into the measuring channel branch 38 and the bypass channel branches 36, adjoins the front subsection 27 of the flow passage 9 in the flow direction of the fluid to be measured, wherein these then open into the mouth channel 35 adjoined by the rear subsection 30 of the flow passage 9. The position of the flow windows 43 in relation to the plate-transverse lamellae 42 is also clearly visible here.

For completeness sake, FIG. 9 shows the flow rate measuring unit 1 from FIG. 1 also in a cross-sectional illustration. The section likewise extends through the substrate 11 comprising the sensor system. This view clearly shows all bypass channel branches 36 and the measuring channel branch 38. The flow passage 9 disposed in the housing part 3 includes a centrally disposed channel widening chamber 12 into which the substrate 11 comprising the sensor system protrudes. It is apparent that, in this exemplary embodiment, the insert plates 16, 16' of the insert plate stack 15 are inserted into the housing 3 with plate-longitudinal recesses 17, 17' pointing in the direction of the stack support plate 18 or the bottom 19 of the channel widening chamber 12. In the region of the sealing element 21, the housing gap dimension 49 of the printed circuit board 5 with respect to the housing 3 can be seen again.

As is apparent from FIGS. 8, 9, the insert plate stack 15 protrudes over the channel widening chamber 12, wherein the housing part 4, which presses the insert plate stack 15, has a flat design and is seated against the flat side 22 of the printed circuit board 5 facing away from the housing part 3. In the variant shown in FIG. 10, the printed circuit board 5 has a thickening 44 on the flat side 22. The printed circuit board 5 has a defined housing gap dimension 49 with respect to the housing part 3 comprising the channel widening chamber 12, at least in the region of the sealing element 21. In the exemplary embodiment shown in FIG. 5, the housing part 4, which presses the printed circuit board 5 against the housing part 3 comprising the channel widening chamber 12 including the insert plate stack 15 accommodated therein, additionally also has a defined housing gap dimension 49' with respect to the printed circuit board 5, which is due to the thickening 44. These measures ensure that the channel widening chamber 12 is closed to the outside in a sealed manner, and that the measuring channel branch 38 and the bypass channel branches 36 are laterally delimited with respect to one another in the flow direction of the fluid. The insert plates 16, 16' are pressed onto one another, but not significantly deformed in the process, and the surface pressure can take on varying levels, depending on the location. For this reason, a second sealing closure is independently provided with the shapeable sealing element 21 in the housing gap 45 between the housing part 3 and the printed circuit board 5. Absolutely tight closure between the insert plates 16, 16' is not necessary, as the pressing onto one another is only intended to ensure that, as described, no undesirable, parasitic channel branch forms. This can even be achieved if the cavities around the insert plate stack 15 are ventilated by one or more targeted openings, as long as no bypass channel branch is created thereby.

Figure 10:
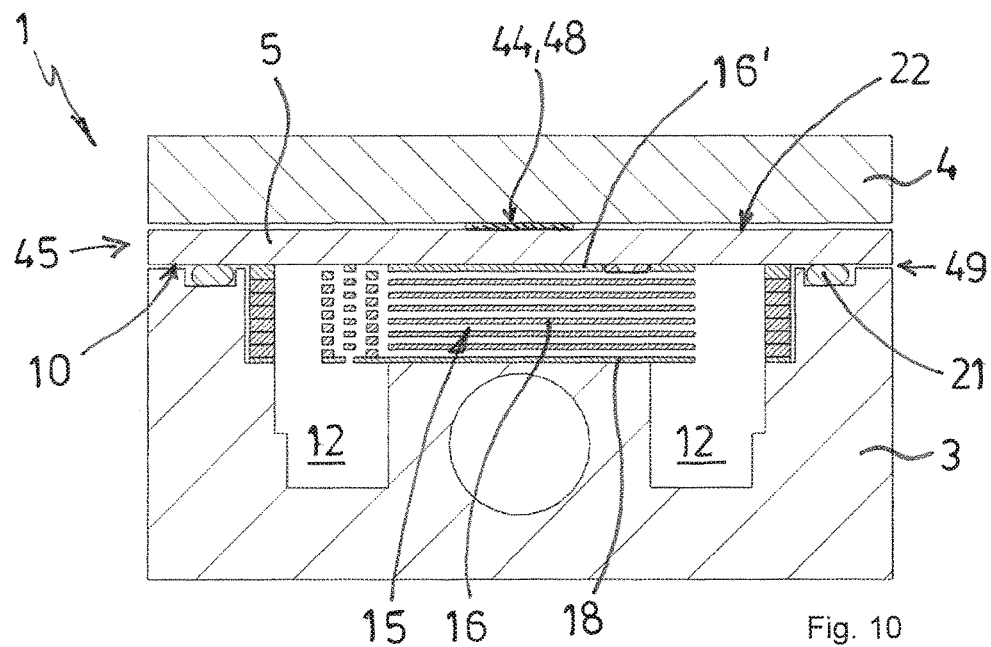
FIG. 10 shows a cross-sectional view of a variant of the flow rate measuring unit according to FIG. 1, comprising a printed circuit board having a central thickening in the housing region.

FIG. 10 shows a cross-sectional illustration of a variant of the flow rate metering unit 1 according to FIG. 1, in which the printed circuit board 5 has a central thickening 44 in the region of the housing 2, or the housing part 4 has a central elevation 48. Otherwise, this variant corresponds to the embodiment described in FIG. 9. By way of the central thickening 44 of the printed circuit board 5, which is seated against the housing part 4, or by way of the central elevation 48, which is seated against the printed circuit board 5, the housing part 4 presses the printed circuit board 5 in the direction of the channel widening chamber 12 of the housing part 3 of the housing 2 when the housing part 3 is screwed to the housing part 4.

Figure 11:
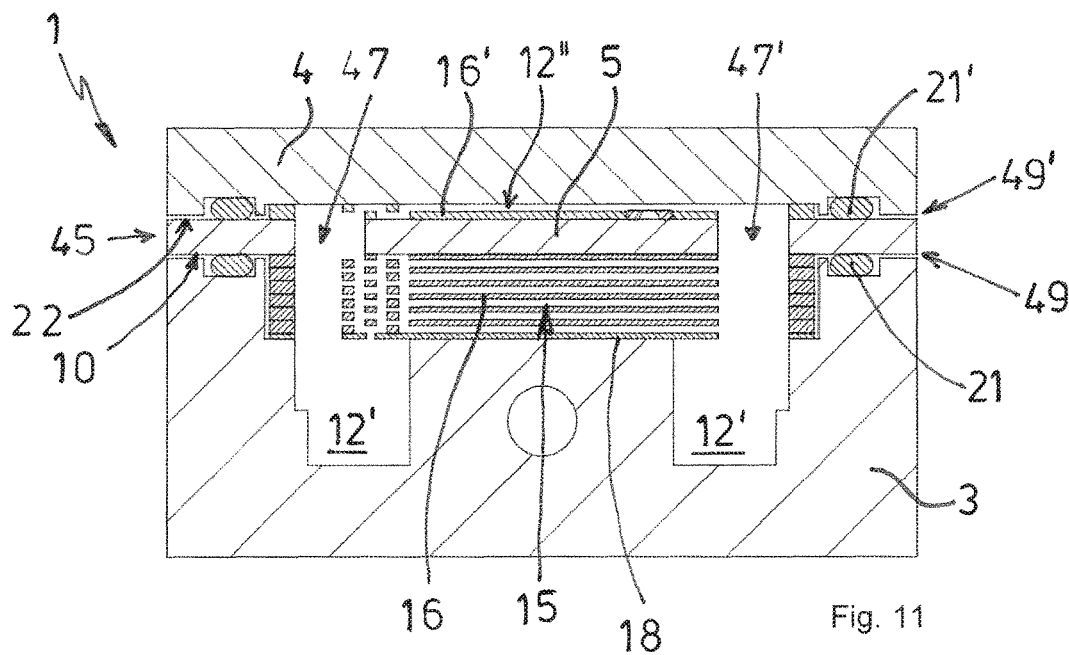
FIG. 11 shows a cross-sectional view of a variant of the flow rate measuring unit according to the invention according to FIG. 1, wherein the printed circuit board extends between two insert plates of the insert plate stack.

FIG. 11 shows a further exemplary embodiment of the flow rate measuring unit 1 according to the invention from FIG. 1, in which the printed circuit board 5 is disposed between the insert plates 16, 16' of the insert plate stack 15. The printed circuit board 5 divides the insert plate stack 15 into a top and a bottom substack. The channel widening chamber 12 extends in the form of a first channel widening chamber section 12' in the housing 3, and a second channel widening section 12" in the housing 4. Moreover, this includes through-conducting openings 47, 47' for the fluid in the region of the branch channel 34 or of the mouth channel 35. The housing parts 3, 4 are disposed stacked on top of one another, with the printed circuit board 5 interposed, wherein the housing parts 3, 4 are screwed together (not visible). The housing part 4 presses the insert plate 16' against the second flat side 22 of the printed circuit board 5, and the insert plate 16' presses the insert plate stack 15 formed only of insert plates 16 against the stack support plate 18 and the housing part 3. A first sealing element 21, which seals the first channel widening chamber section 12' in the housing 3 to the outside, is disposed against the housing part 3. Furthermore, a second sealing element 21', which seals the second channel widening chamber section 12" in the housing 43 to the outside, is disposed against the housing part 4. Here as well, a housing gap 45 is formed between the connected housing parts 3, 4 outside the channel widening chamber 12, wherein the insert plate stack 15 is clamped between the two housing parts 3, 4, forming the housing gap 45. The sealing element 21 is pressed between the housing part 3 and the first flat side 10 of the printed circuit board 5, forming a certain housing gap dimension 49, while the sealing element 21' is pressed between the housing part 4 and the second flat side 22 of the printed circuit board 5, forming a certain housing gap dimension 49'. Otherwise, this embodiment is designed in a manner corresponding to the above-described embodiment in which the printed circuit board presses on the top insert plate 16', and the channel widening chamber 12 is formed only in the housing part 3. FIG. 11 shows an embodiment in which only the insert plate 16' is located above the printed circuit board 5, in the figure. There could also be additional insert plates 16, whereby the channel widening chamber 12 would evidently also extend into the housing part 4.

Figure 12:
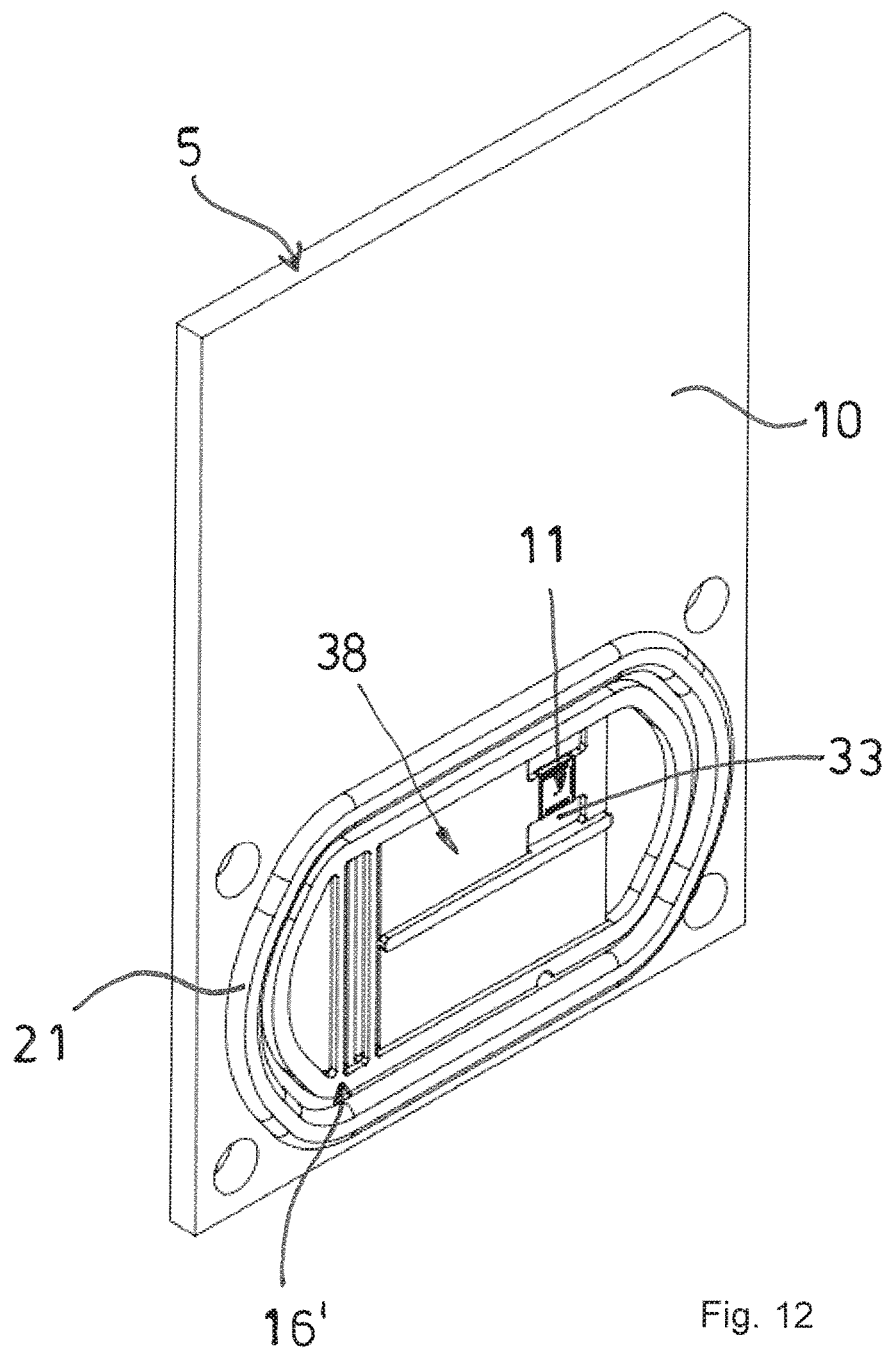
FIG. 12 shows the printed circuit board of the flow rate measuring unit from FIG. 1 with a view onto the substrate comprising the sensor system.

FIG. 12 shows the printed circuit board 5 of the flow rate measuring unit 1 from FIG. 3 again with a view onto the substrate 11 comprising the sensor system. Here again, it is shown that the seal 21 surrounds the measuring channel branch 38 and the substrate 11 comprising the sensor system. The substrate 11 comprising the sensor system is disposed on the first flat side 10 of the printed circuit board 5 and engages in the plate window 33 of the insert plate 16'. The substrate 11 comprising the sensor system does not protrude into the measuring channel branch 38, but ends flush with the same, so that a laminar flow is ensured in the measuring channel branch 38. The printed circuit board 5 carries an electronic circuit, which is not shown in FIG. 11, for processing a measuring signal of the sensor system on the substrate 11, and additionally comprises conductors (not shown) as connecting lines leading to the substrate 11.

Figure 13A:
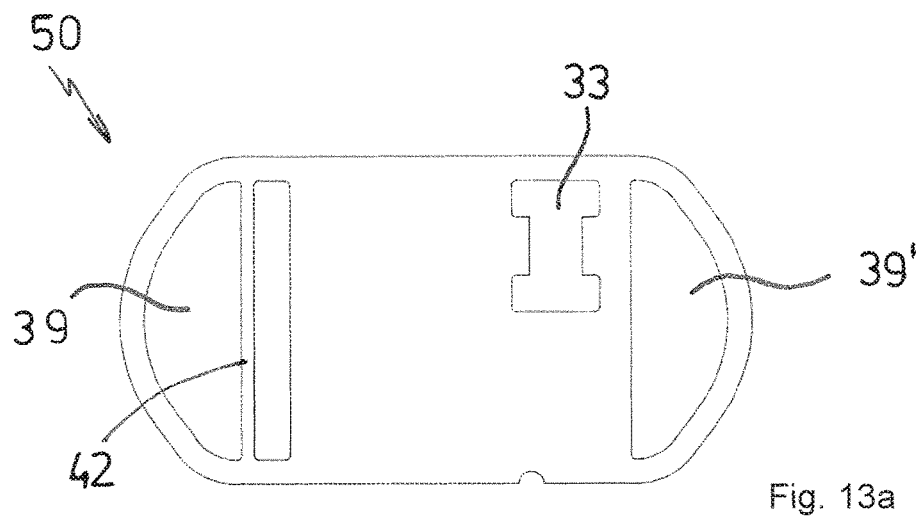
FIGS. 13a-13c shows three different types of insert plates, which, situated appropriately on top of one another, form a fully functional insert plate, as shown in FIGS. 6a and 6b, having a plate-longitudinal recess, wherein FIGS. 13a and 13c each show an insert plate without plate-longitudinal recesses.
Figure 13B:
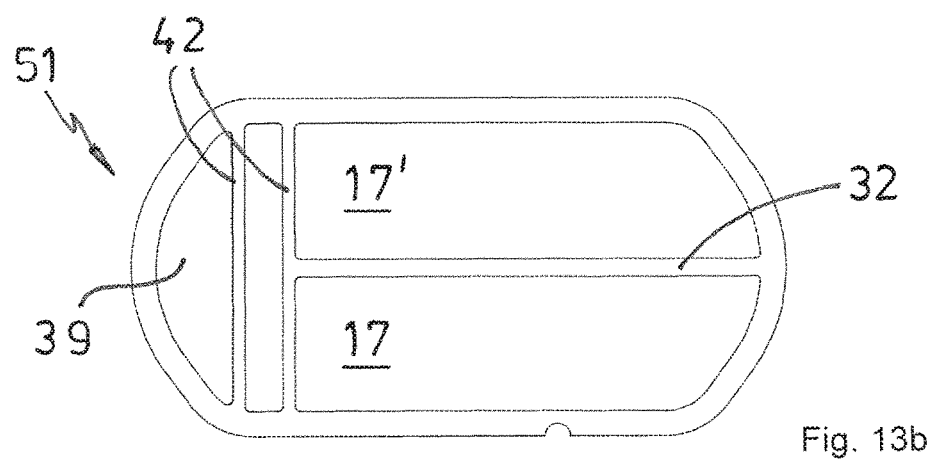
Figure 13C:
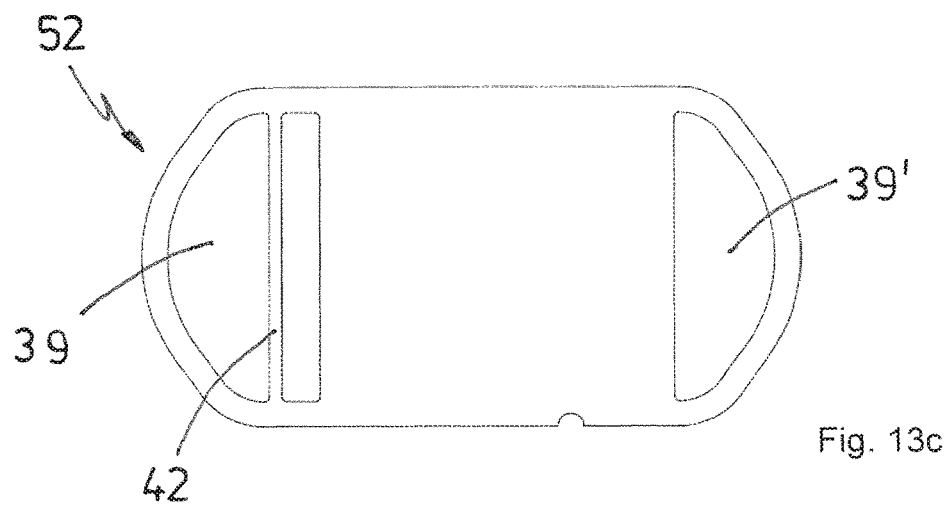

FIG. 13 shows three different types of insert plates 50, 51, and 52 by way of example, which can each be disposed appropriately in alternating sequence to form the plate stack 15. By way of example, FIG. 13*a* shows the one type in the form of a flat insert plate 50 having no plate-longitudinal recesses, wherein the insert plate 50 of the plate stack 15 is illustrated with a plate window 33 for the semiconductor chip here. This plate window 33 is absent in the other type of the flat plate 52 according to FIG. 13*c*. FIG. 13*b* shows the third type in the form of an insert plate 51 including plate-longitudinal recesses 17, 17', which are designed as plate-longitudinal apertures. In this embodiment, an insert plate 16', as shown in FIG. 6*b*, is thus replaced by two insert plates 50, 51, and an insert plate 16, as shown in FIG. 6*a*, is replaced by two insert plates 51, 52. The insert plates 50, 51, 52 comprise all the above-described elements having the corresponding reference numerals. The insert plates 50, 51, 52 are designed as stampings. Together with the plate aperture 39 of the insert plate 51, the plate-longitudinal rib 32 in the insert plate 51 forms the mouth channel 35. This is divided by the plate-longitudinal rib 32 in this case, wherein a connection, however, exists between the resultant two regions of the mouth channel 35, since the individual plate-longitudinal ribs 32 are spaced apart from one another due to the arrangement in the stack 15.

The invention claimed is:

1. A flow rate measuring unit for establishing the flow rate of a fluid, comprising a housing, which includes at least two housing parts that can be connected to one another and in which a flow passage extends at least in one of the housing parts from a housing inlet to a housing outlet of the housing, the flow passage in an intermediate region comprising a measuring channel branch and at least one bypass channel branch, wherein
the flow passage, in the intermediate region, comprises a channel widening chamber, in which an insert plate stack composed of at least two insert plates is disposed, which form at least one bypass channel branch,
at least one electric sensor system disposed on a substrate is disposed on a wall of the measuring channel branch,
in the channel widening chamber, the flow passage comprises a branch channel from which the at least one bypass channel branch branches off orthogonally, and a mouth channel, into which the at least one bypass channel branch opens orthogonally,
at least some of the insert plates at least in a center region have at least one plate-longitudinal recess extending in the longitudinal direction of the insert plates serving as the bypass channel branch, and
the channel widening chamber is sealed to the outside by way of a shapeable sealing element that is provided for sealing and disposed on at least one of the housing parts, wherein
the insert plates of the insert plate stack are pressed against one another in a sealed manner by the at least one other housing part, in the case of connected housing parts,
a housing gap is formed between the connected housing parts outside the channel widening chamber, wherein the insert plates are situated on top of one another in a defined manner, and the insert plate stack is clamped between the at least two housing parts, forming a certain housing gap dimension, and
the insert plates include plate end regions that each have a plate aperture, wherein the plate apertures in the insert plate stack form the branch channel and the mouth channel, and wherein the at least one bypass channel branch and the measuring channel branch branch off the branch channel and open into the mouth channel.

2. The flow rate measuring unit according to claim 1, wherein the insert plate stack protrudes over the channel widening chamber, and/or the other housing part, which presses the insert plate stack, at least centrally includes an elevation, whereby the housing gap between the at least two housing parts is determined at least in the region of the sealing element provided for sealing.

3. The flow rate measuring unit according to claim 1, comprising at least one shapeable sealing element sealing the housing gap, preferably a sealing ring, a flat seal or an adhesive.

4. The flow rate measuring unit according to claim 1, wherein the measuring channel branch is formed by at least one insert plate of the insert plate stack including at least one plate-longitudinal recess extending in the longitudinal direction of the insert plate, and extends parallel to the at least one bypass channel branch, wherein, in the channel widening chamber, the measuring channel branch branches orthogonally off the branch channel and subsequently opens orthogonally into the mouth channel, and the measuring channel branch and the at least one bypass channel branch extend next to and/or on top of one another.

5. The flow rate measuring unit according to claim 1, wherein
the insert plate stack comprises at least two different types of insert plates, which are each disposed in alternating sequence, wherein one type is designed as a flat insert plate having no plate-longitudinal recesses, and the other type is designed as a flat insert plate having plate-longitudinal recesses designed as plate-longitudinal apertures,
or
the insert plate stack comprises only one type of insert plates, which are designed as profiled insert plates having groove-like plate-longitudinal recesses.

6. The flow rate measuring unit according to claim 4, wherein the plate-longitudinal recesses of the insert plate which form the measuring channel branch and at least one bypass channel branch, and/or the plate-longitudinal recesses of the at least one insert plate which form only bypass channel branches, have a uniform cross-sectional shape.

7. The flow rate measuring unit according to claim 1, wherein all insert plates of the insert plate stack are designed identically at least in terms of the contour thereof, wherein the measuring channel branch and the at least one bypass channel branch have an identical cross-sectional shape and an identical length.

8. The flow rate measuring unit according to claim 1, wherein an end face of the insert plate stack, which faces away from the substrate comprising the sensor system, is supported on a stack support plate.

9. The flow rate measuring unit according to claim 1, wherein the insert plates of the insert plate stack comprise at least one turbulence filter, which is integrally formed on the respective insert plate and which is disposed, in each case, upstream of the measuring channel branch and/or the bypass channel branches of the insert plate on the respective inlet regions and extends into the branch channel, wherein the turbulence filter is designed as at least one plate-transverse lamella or as a plate mesh, preferably vertically offset from the plate-longitudinal recesses of the insert plate.

10. The flow rate measuring unit according to claim 1, wherein
the flow passage is disposed in one of the housing parts,
the channel widening chamber is disposed only in the housing part including the flow passage, and
electrical connecting lines for the sensor system carried by the substrate are routed out of the housing between the housing parts.

11. The flow rate measuring unit according to claim 1, wherein a printed circuit board, which carries at least the substrate comprising the sensor system and comprises the connecting lines for the substrate comprising the sensor system, is disposed between the connected housing parts, wherein the printed circuit board extends into the housing gap between the housing parts, and the channel widening chamber is sealed with respect to the printed circuit board and/or to the outside by way of the at least one shapeable sealing element provided for sealing.

12. The flow rate measuring unit according to claim 11, wherein the other housing part presses the printed circuit board against the insert plate stack.

13. The flow rate measuring unit according to claim 1, wherein the printed circuit board is disposed between insert plates of the insert plate stack and divides the insert plate stack and the channel widening chamber, and comprises through passages in the region of the branch channel or of the mouth channel.

14. The flow rate measuring unit according to claim 1, wherein the insert plates are stamped, embossed and/or etched metal strips, and preferably sheet metal strips.

15. A flow rate control unit for controlling the flow rate of a fluid, comprising a flow rate measuring unit, which comprises a measuring channel branch including an electric sensor system disposed on a substrate, and an electrically actuatable valve unit for controlling the fluid, characterized by a flow rate measuring unit according to claim 1, wherein the valve unit is connected in series with the flow rate measuring unit, and the sensor system of the substrate and the valve unit are electrically connected to an electronic control unit.

* * * * *